Oct. 13, 1959

W. B. DEAN 2,908,230

RAILWAY CAR TRUCK

Filed Jan. 30, 1956

INVENTOR
Walter B. Dean

BY Wm. R. Glisson
ATTORNEY

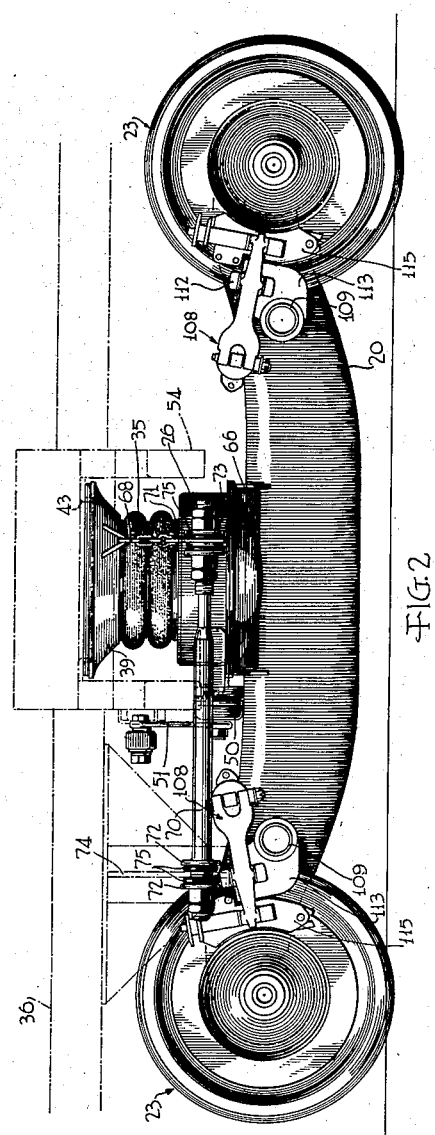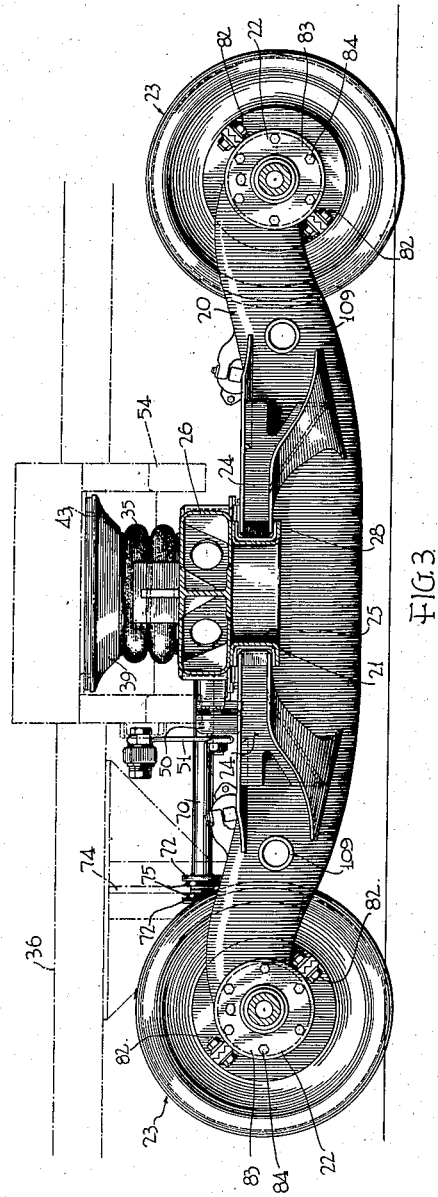

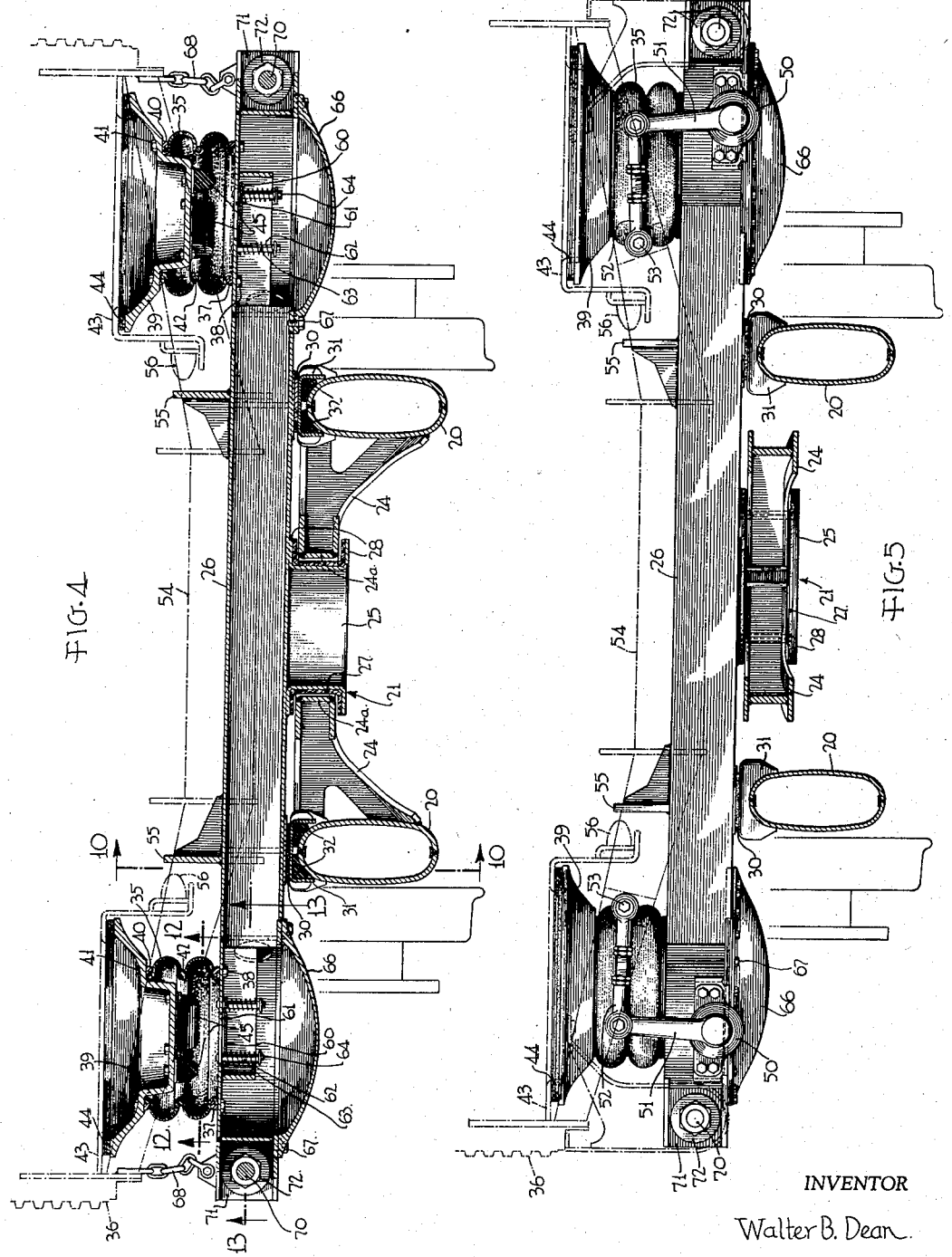

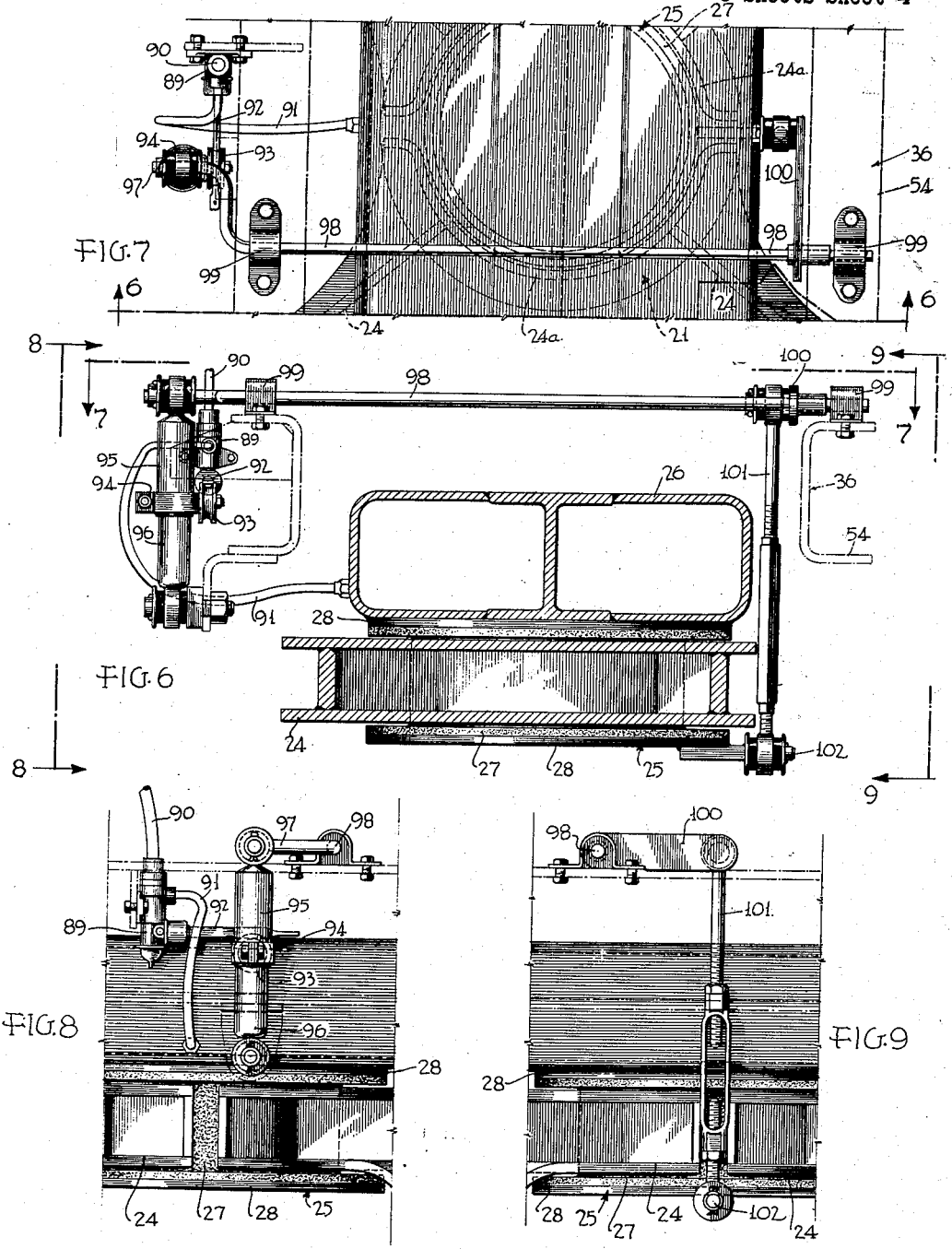

Oct. 13, 1959 W. B. DEAN 2,908,230
RAILWAY CAR TRUCK
Filed Jan. 30, 1956 5 Sheets-Sheet 5
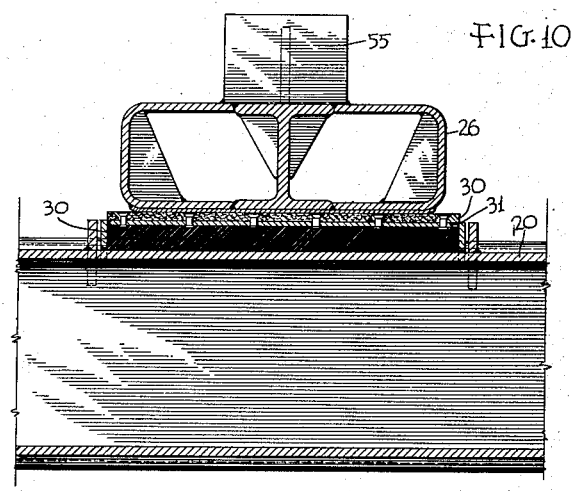
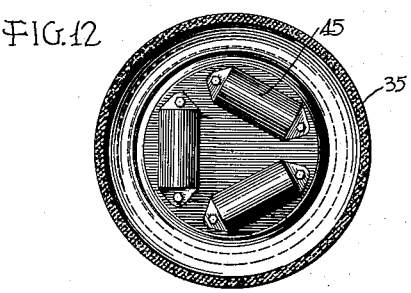
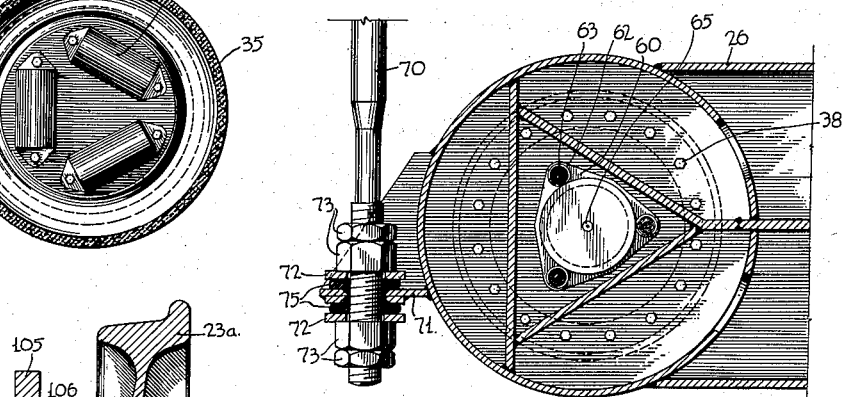
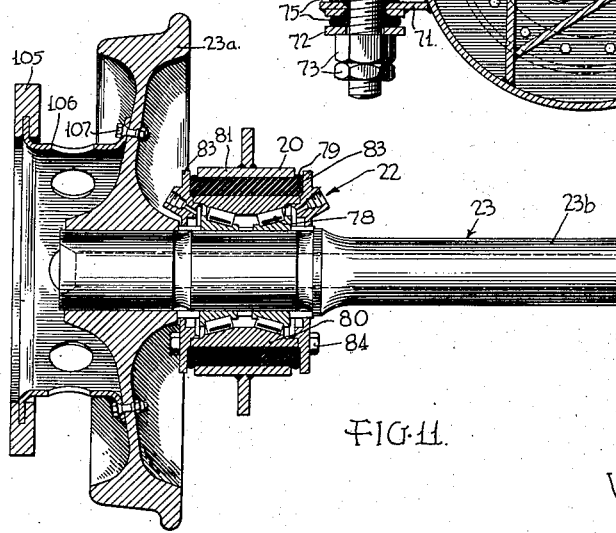
INVENTOR
Walter B. Dean
BY Wm. R. Glisson
ATTORNEY 2,908,230
Patented Oct. 13, 1959

2,908,230

RAILWAY CAR TRUCK

Walter B. Dean, Narberth, Pa., assignor to The Budd Company, Philadelphia, Pa., a corporation of Pennsylvania Application January 30, 1956, Serial No. 562,180

6 Claims. (Cl. 105—182)

This invention relates to railway car trucks and has for an object the provision of improvements in this art.

One of the principal objects of the invention is to provide a truck which is much simpler in construction than the usual trucks yet which will provide action which is equal to or superior to that provided by the more complex trucks.

Another object is to provide a truck which is very flexible so that the wheels can negotiate vertical irregularities in the rails without subjecting the truck frame to undue strains and without lifting wheels off the rail with danger of derailment. This is accomplished by providing side frames which are independent of each other, being connected through the axles only at flexible joints and being centrally restrained by a universal joint.

Another object is to provide such a simple truck which is solidly maintained in tram. This is accomplished by restraining the movement of the truck frame elements which are connected at the central universal joint.

Another object is to cushion the car body against a wide variety of undesired movements caused by vertical irregularities in track. These may be considered as high and low frequency oscillations which are normally handled by a double spring system, one of which is damped. The undamped spring in this multi-spring system cushions the body against high frequency oscillations, whereupon the damping action comes into play in order to prevent resonant oscillations of the car body. If both spring systems were damped or if a single damped spring system were used, high frequency oscillations would be transmitted through the damping means employed, resulting in a harsh ride.

According to the present invention, a single air spring system is used and this, by virtue of its inherent characteristics of variable damping and variable spring rate, can be arranged to perform the functions of the dual spring system normally employed. The air spring is connected with an air reservoir through an orifice having a spring-pressed bleed closure so that when the air spring is deflected slowly, air is compressed both in the air spring chamber and in the reservoir, and in the passing of air from one space to the other through the orifice, damping occurs at the restraint provided by the orifice; and when the air spring is deflected quickly, air is compressed principally in the air spring chamber since there is not time for it to pass through the orifice, which increases the spring rate and reduces damping. The spring loading on the orifice closure acts against the escape of air from the air spring chamber in order to limit the effect of the orifice during a rapidly applied displacement of large amplitude.

Another object is to provide damping against excessive free swiveling of the truck, especially compensating for car loading, to minimize shimmy which is especially troublesome when wheels have become worn from use. According to the present invention, this is accomplished by carrying the vertical loads on side bearings provided with non-metallic friction surface material of known characteristics. The side bearings are rubber cushioned to allow independent motion of the side frames, principally a rocking motion in a vertical plane, and to reduce the transmission of noise and vibrations.

Another object is to minimize metallic noise and wear. This is done by providing the air springs and rubber-backed side bearings referred to and also by providing non-metallic contact elements at the center joint and rubber cushions at the axle bearing joints. Further, while the air springs provide cushioning and some restraint of vertical and lateral movements, it is desirable to provide restraining links to oppose longitudinal movement and damping means to oppose certain other movements; and all of these movement restricting elements are provided with non-metallic cushioning elements. The use of non-metallic elements at sliding surfaces also avoids the need for lubrication.

Another object is to reduce the bending moments on the car axle. This is done by placing the axle bearings inboard of the wheels where the bending moments due to the car weight are largely compensated by bending moments due to centrifugal force acting on the wheel flanges. The centrifugal force referred to is that of the car on curved track, which centrifugal force presses the flanges of the outer wheels against the side of the rail to create a moment about the wheel radius as a lever arm. With outboard bearings these moments are additive. When roller bearings are used, there is an advantage in using inboard bearings because wheels require service more frequently than do roller bearings.

Another object is to provide a frame construction in which the loadings are made as direct as possible and the bending moments are minimized so that beam loadings may be made lighter with a correspondingly lighter weight construction. This is done by supporting the sides of the car body on the air springs and supporting the air springs on a floating bolster near its ends and supporting the bolster directly on the side frames a short distance inboard from its ends. The side frames, which can be made deep, carry the loadings directly to the inboard axle bearings. The loads due to braking and centrifugal force are also carried through direct paths.

Another object is to minimize roll. This is aided by several design features. First, the air springs are spaced apart as widely as clearance conditions will permit, being placed almost directly under the side sills of the car. This increases the roll stiffness of the spring suspension. Lateral reactions at the springs and at lateral shock absorbers which are provided are opposed at a point as high as the floor height will permit. Because this point more nearly coincides with the center of gravity of the car than lower points, the roll moment acting on the springs is reduced. It would be undesirable, however, to place the point of support above the center of gravity of the car because the car would lean inwardly on curves and this would cause interference at high level platforms and would also be impractical from an interior arrangement standpoint to have floor space restricted by upwardly projecting housings for underfloor equipment.

Another object is to locate equipment which requires attention at the points which are most convenient for service. As will be evident as the description proceeds, the present equipment is well designed toward this desirable arrangement.

Another object is to compensate for car loading yet retain the desirable effects of soft springs. When light weight cars are used with light springs, the car height varies so much between empty and loaded conditions that coupling and platform heights are difficult to match. According to the present invention, the air spring pressures are coordinated with loadings and the pressure is increased as the load increases so that the effects of soft springing are maintained without any considerable unfavorable effect on coupling and platform height. Some lag in adjustment is provided to avoid momentary conditions and conserve the air supply.

Another object is to avoid sliding journal box parts. This is provided by mounting the axle bearings in resilient elastic retainers which provide restrained universal movement. As mentioned, this arrangement avoids noise and wear. The retainer may be formed of separable parts so the axle and its bearings can be readily removed when desired.

Another object is to provide a large size but relatively light weight bolster which is fully enclosed to form an air reservoir associated with the air springs, the bolster space being either unitary to serve both air springs conjointly, or separated to serve each spring separately, or being separate with a controlled orifice to compensate for roll under cornering conditions and the like.

The above and other objects of the invention and various features of novelty will be apparent from the following description of an exemplary embodiment, reference being made to the accompanying drawings thereof, wherein:

Fig. 2 is a side elevation taken along the line 2—2 of Fig. 1;

Fig. 3 is a vertical longitudinal section taken on the line 3—3 of Fig. 1;

Fig. 4 is a vertical transverse section taken on the line 4—4 of Fig. 1;

Fig. 5 is a vertical transverse section taken on the line 5—5 of Fig. 1;

Fig. 6 is an enlarged vertical longitudinal section taken on the line 6—6 of Fig. 1;

Fig. 7 is a top plan view of the parts shown in Fig. 6, the view being taken on the line 7—7 of Fig. 6;

Fig. 8 is a left side elevation of the parts shown in Fig. 6, the view being taken on the line 8—8 of Fig. 6;

Fig. 9 is a right side elevation of the parts shown in Fig. 6, the view being taken on the line 9—9 of Fig. 6;

Fig. 10 is an enlarged longitudinal section taken on the line 10—10 of Figs. 1 and 4;

Fig. 11 is an enlarged transverse vertical section taken on the line 11—11 of Fig. 1;

Fig. 12 is an enlarged horizontal section looking upward, the view being taken on the line 12—12 of Fig. 4; and Fig. 13 is an enlarged horizontal section looking upward, the view being taken on the line 13—13 of Fig. 4.

Figure 1:
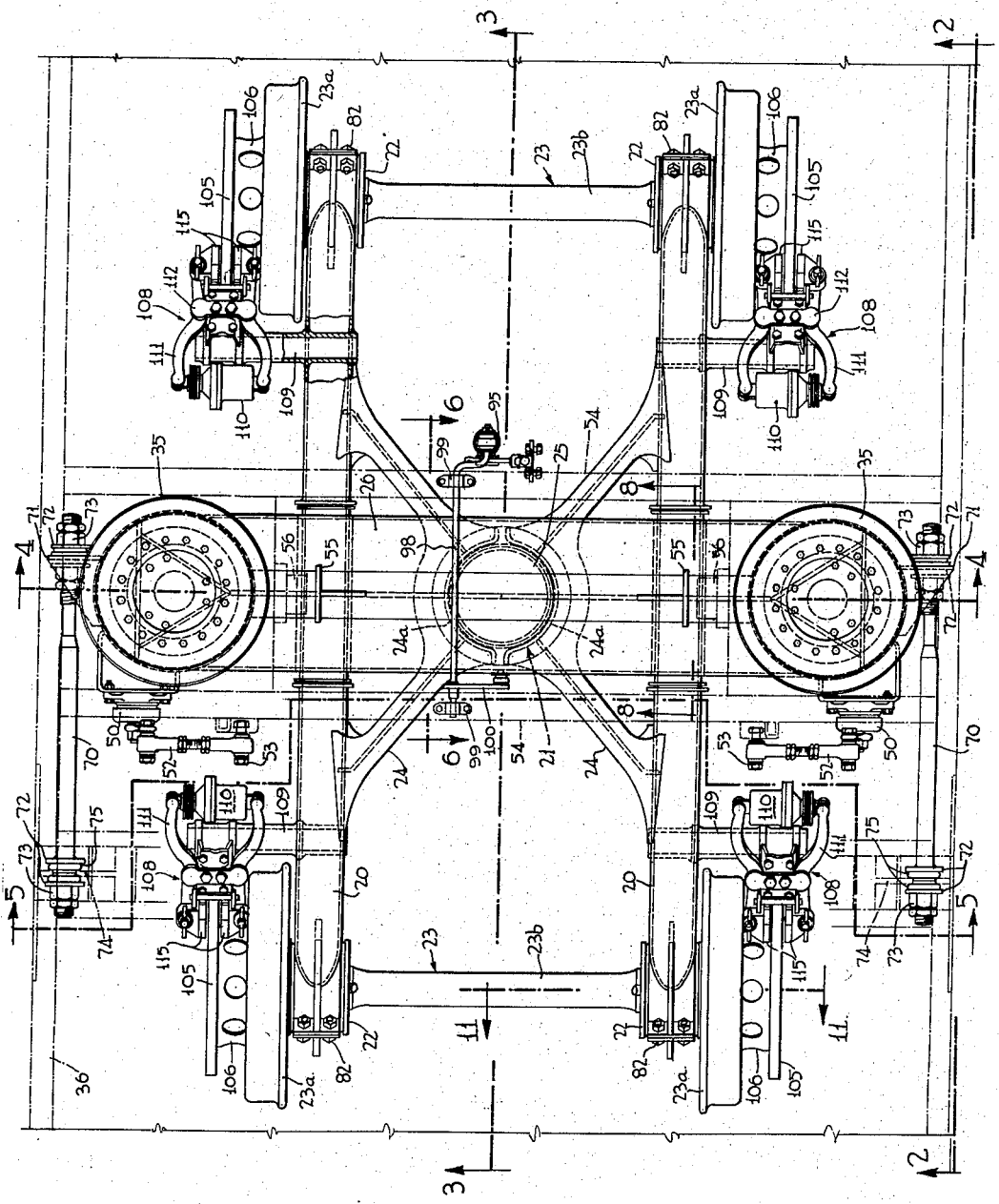
Fig. 1 is a top plan view of the truck, certain parts of the car body with which it is associated being shown in phantom lines.

The truck comprises two rigid but independently movable side frames 20 which are loosely connected or restrained at a center joint 21 and connected at the ends at universal joints 22 with wheel-axle units 23. The side frames comprises rigid inboard projections 24 of inverted V-shape which are concave, as at 24a, on their facing portions to embrace (Fig. 4) a cylindrical king-post-like member 25 carried below a bolster 26. The projections 24 have universal movement about the member 25, a tough resilient non-metallic lining 27, such as composition brake lining, being provided between the opposed surfaces to furnish this free movement without metallic noise and wear. The lining may be secured to either facing part, depending on requirements. It is here shown on the king post member 25. Spaced flanges 28 on the member 25 loosely retain the projection ends in position. The general configuration of the two side frames and their projections together resembles a Roman numeral bar-X with large and projecting end bars and a non-rigid center crossing.

As shown in Figs. 4, 5 and 10, the bolster 26 is made of large section and hollow for lightness and strength and is sealed to form a large air reservoir. It is supported on the top of the side frames, non-metallic lining 30, as of molybdenum impregnated "Formica," being interposed. This lining is carried by saddles 31 of metal which, in turn, are mounted on resilient pads 32, as of rubber-like material such as "Neoprene," secured to the tops of the side frames. This provides for horizontal movement between the bolster and side frame members as well as vertical rocking movement of the side frame members beneath the bolster, all without metallic noise and wear.

The side frame members 20 are made strong, rigid and light, as of welded hollow sections, and carry the axle bearing joints in their planes inboard of the wheels 23a.

Near its ends the bolster supports the single spring system of the truck, here embodied in air springs 35 of the bellows type. The car body 36, shown in phantom lines, rests on the upper ends of the air springs at points near the side sills of the car. The lower end of an air spring is clamped to the bolster by a base ring 37 and bolts 38 and the upper end is clamped to a sealing head 39 by a ring 40 and bolts 41. One or more girdle rings 42 are provided on the air spring, the number depending on the number of restricted sections between convolutions there are on the air spring. The car underframe is provided with a down-flanged seat 43 resting on the upper end of the sealing head 39, a non-metallic ring 44, as of "Micarta," being interposed. Bumper pads 45, as of rubber-like material such as "neoprene," are secured to the lower surface of the sealing head to limit movement and support the car if no air is present in the air cylinders.

The air cylinders take vertical movements and limited transverse lateral movements between the car and the truck. Sudden transverse or side movements are resisted by a damper or shock absorber 50 mounted on the bolster and having its arm 51 connected by an adjustable link 52 to a pin 53 carried by a car cross bearer 54, shown in phantom lines. Means are provided for limiting relative transverse movement between the bolster and car body, the means shown here comprising striker projections 55 carried by the bolster in position to engage bumpers 56 carried by the car body underframe.

Vertical motion is damped by a plate valve 60 placed as a closure over an aperture 61 in the top bolster plate between the air spring chamber and the reservoir chamber formed in the hollow bolster. The valve plate 60 is loaded by springs 62 carried on rods 63 having adjusting nuts 64. A small return leak orifice 65 in the plate, which may be adjustable in size, controls the rate of action of the spring in certain phases. Access for adjustment and inspection is provided by a removable sealing cap 66 retained over an outer opening in the bolster by cap nuts 67. Excess movement of separation between the car body and bolster is limited by safety chains 68.

It is desired that the relative longitudinal movement between the car body and the bolster be limited to a small amount. To provide for this while at the same time providing for the other required movements of the bolster, there are provided stay or anchor bars 70 secured at one end to flanges 71 of the bolster by washers 72 and nuts 73 and secured at the other end to depending brackets 74 carried by the car body by similar washers and nuts, resilient doughnuts 75, as of rubber-like material, being interposed between the washers and the intermediate part to allow but resist side movements in various directions.

The required universal movement at the joints 22 between the axle bearings 78 (Fig. 11) on the axles 23b is provided by an elastic resilient layer 79, as of a rubber-like material such as "neoprene," which is disposed between the outer bearing race 80 and a tubular retainer 81 carried by the side frame 20. The parts 79 and 81 are split (Fig. 3) and the parts of the latter are held together by bolts 82. End plates 83 held by bolts 84 prevent axial displacement.

Means are provided for adjusting the air spring pressure to the load on the car. This mechanism forms the subject matter of another application S. N. 597,422, filed July 12, 1956, but is disclosed herein to show its relationship to the air springs and truck as a whole. Herein this is accomplished (Figs. 6–9) by a pressure regulating valve 89 mounted on the car body and interposed between the main pressure line 90 and a flexible line 91 leading to the bolster reservoir. The valve regulating arm 92 is operated in one direction by a spring (inside the valve and not shown) and in the other direction by a roller 93 carried by a bracket 94 adjustably mounted on the movable part 95 of a shock absorber or damper having its other part 96 mounted on the car body. The movable part 95 is operated by one arm 97 of a torsion bar 98 mounted in bearings 99 on the car body and having its other arm 100 connected by an adjustable link 101 to a pin 102 carried beneath the bolster, as on the bottom flange of king-post member 25.

Disk brakes are provided on the truck. They are preferably mounted outboard of the wheels where they will be accessible for service and repair. They comprise disks 105 secured by flanges 106 and bolts 107 to the wheels and brake operating units 108 mounted on rigid tubular bars 109 securely anchored to the side frames, as by welding. The operating units comprise air cylinder-piston units 110 and tong levers 111 pivoted on a frame 112 which has turning movement about a longitudinal axis on a bracket 113 carried on the bar 109. The shoes 115 and their mountings are not specifically disclosed herein but could well be of a common type in regular use. As an example, see Patents 2,650,680, 2,622,704, 2,451,329, 2,451,326, and others. For light weight cars the disk may be made of a single thickness without ventilating passages, especially since it is placed in an outboard location where the cooling air flow is good.

It is thus seen that the mounting of the bolster on the truck underframe and wheels with the independently movable side frame members and the single-system air spring support of the car body on the ends of the bolster provides a very simple but effective arrangement for producing a smooth, quiet car ride and fulfilling the objects of the invention.

While one embodiment has been specifically disclosed for purposes of illustration, it is to be understood that there may be various modifications and embodiments within the general scope of the invention.

What is claimed is:

1. A railway car truck for supporting a car body, comprising in combination, two longitudinally spaced wheel-axle units each including an axle and two transversely spaced track wheels rigidly secured thereon, two transversely spaced side frames each including a longitudinal side frame proper and a transversely and inwardly extending projection rigid with the side frame and having its inner end disposed near the center of the transverse space between the side frames and near the center of the longitudinal space between the axles, bearings for the axles carried by the ends of the side frames near the wheels on the axles, supports for said bearings on the side frames, said bearings and their supports being formed and arranged to provide universal movement of the axles relative to the side frames but preventing any substantial axial and transverse movement of the axle relative to the side frame, the axles with their bearing connections serving to tie said side frames together while permitting twisting movements of the side frames in a vertical plane to allow the wheels to follow track irregularities, bolster slide supports carried on the tops of said side frames intermediate their length for supporting a body bolster thereon for relative turning movement about a central vertical axis, a transverse body bolster mounted on said slide bearings to have its weight supported thereon, means forming a central turning joint between the middle part of said bolster and the inner ends of said side frame projections, said turning joint including means for retaining the inner ends of said projections within upper and lower limits in a vertical direction but being formed to provide limited free and separate movement to allow the projections to twist when the side frames twist in a vertical plane, said slide supports being formed and arranged to allow twisting movement in a vertical plane of the side frames beneath the bolster, said central turning joint including means to limit the movement of said projection ends toward each other and limiting the longitudinal movement of said projection ends so that braking and inertia loads are transmitted through said central joint but free from substantial vertical loads, resilient spring means supporting the car body at the sides on the bolster, and means connecting the bolster to the car body to hold it substantially against turning about a vertical axis relative thereto while allowing free relative vertical movement for the action of said spring means and allowing limited transverse movement between the bolster and car body.

2. A railway car truck as set forth in claim 1, further characterized by the fact that said central turning joint comprises a vertical king post member rigidly carried by said bolster, concave bearing sockets provided on the inner ends of said side frame projection ends, and spaced flange elements confining said inner end sockets while allowing limited vertical movement between said spaced flange elements.

3. A railway car truck as set forth in claim 2, further characterized by the fact that non-metallic resilient lining material is disposed between said concave end sockets and said king post member to take wear, absorb shocks and noise and snub the movements between the relatively movable parts.

4. A railway car truck as set forth in claim 1, further characterized by the fact that said bolster slide supports include non-metallic resilient lining material between the bolster and side frame to take wear, absorb shocks and noise and snub the movements between the relatively movable parts.

5. A railway car truck as set forth in claim 4, further characterized by the fact that said bolster slide supports include a rigid metal saddle plate and elastic backing material between said plate and said side frame, and said non-metallic resilient lining material being carried on the top of said rigid metal saddle plate.

6. A railway car truck as set forth in claim 1, further characterized by the fact that said axle bearing supports include elastic lining material surrounding said bearings to allow but resiliently restrain the twisting movements between the side frames and the axles, that non-metallic wear lining material is provided at said bolster slides on the side frames, that non-metallic wear lining material is provided between relatively movable parts at said central turning joint, and that non-metallic air springs are provided between the bolster and car body, to snub and restrict movements between parts and to inhibit transmission of noise and vibration.

References Cited in the file of this patent
UNITED STATES PATENTS

| | | |
|---|---|---|
| 2,023,756 | Brownyer | Dec. 10, 1935 |
| 2,133,279 | Brown | Oct. 18, 1938 |
| 2,190,762 | Anderson | Feb. 20, 1940 |
| 2,215,182 | Latshaw | Sept. 17, 1940 |
| 2,354,016 | Haynes | July 18, 1944 |
| 2,500,906 | Soloview | Mar. 14, 1950 |
| 2,630,079 | Cottrell | Mar. 3, 1953 |
| 2,636,451 | Watter | Apr. 28, 1953 |